(12) United States Patent
Yamazaki et al.

(10) Patent No.: US 6,747,266 B2
(45) Date of Patent: Jun. 8, 2004

(54) LASER BEAM RECEIVER

(75) Inventors: Takaaki Yamazaki, Tokyo (JP);
Kenichiro Yoshino, Tokyo (JP);
Shichiro Onuma, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 213 days.

(21) Appl. No.: 09/943,594

(22) Filed: Aug. 30, 2001

(65) Prior Publication Data

US 2002/0038845 A1 Apr. 4, 2002

(30) Foreign Application Priority Data

Aug. 30, 2000 (JP) ........................................ 2000-261796

(51) Int. Cl.[7] .............................................. H01J 40/14
(52) U.S. Cl. ..................... 250/216; 250/234; 250/206.1
(58) Field of Search ................................ 250/216, 206.1, 250/206.2, 234, 550, 203.1, 221; 356/3.08, 4.08, 222; 33/293

(56) References Cited

U.S. PATENT DOCUMENTS 5,838,360 A * 11/1998 Harrold et al. ............. 347/258
6,337,473 B2 * 1/2002 Yamazaki et al. ....... 250/206.1

* cited by examiner

Primary Examiner—Kevin Pyo
(74) Attorney, Agent, or Firm—Baker Botts LLP

(57) ABSTRACT

A laser beam receiver includes a filter device, and a photodetecting means including a plurality of photodetectors. The laser beam receiver expands a laser beam in a scanning direction in which the laser beam is moved for scanning and diffuses the expanded laser beam by the filter device. The filter device has a lenticular part capable of expanding the laser beam in the scanning direction, and a diffusing part capable of diffusing expanded laser beam.

4 Claims, 7 Drawing Sheets

FIG. 2
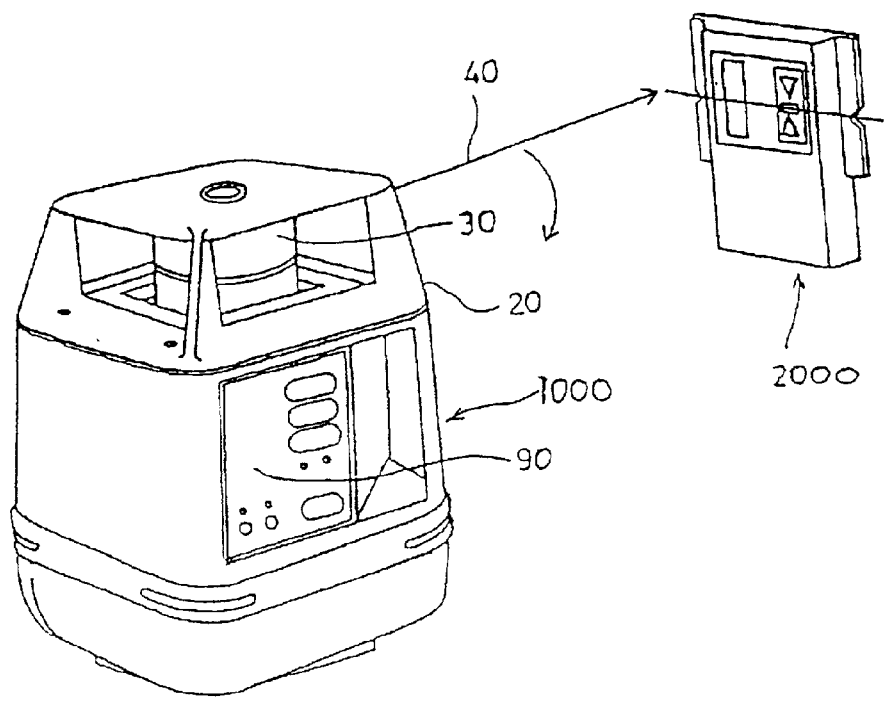
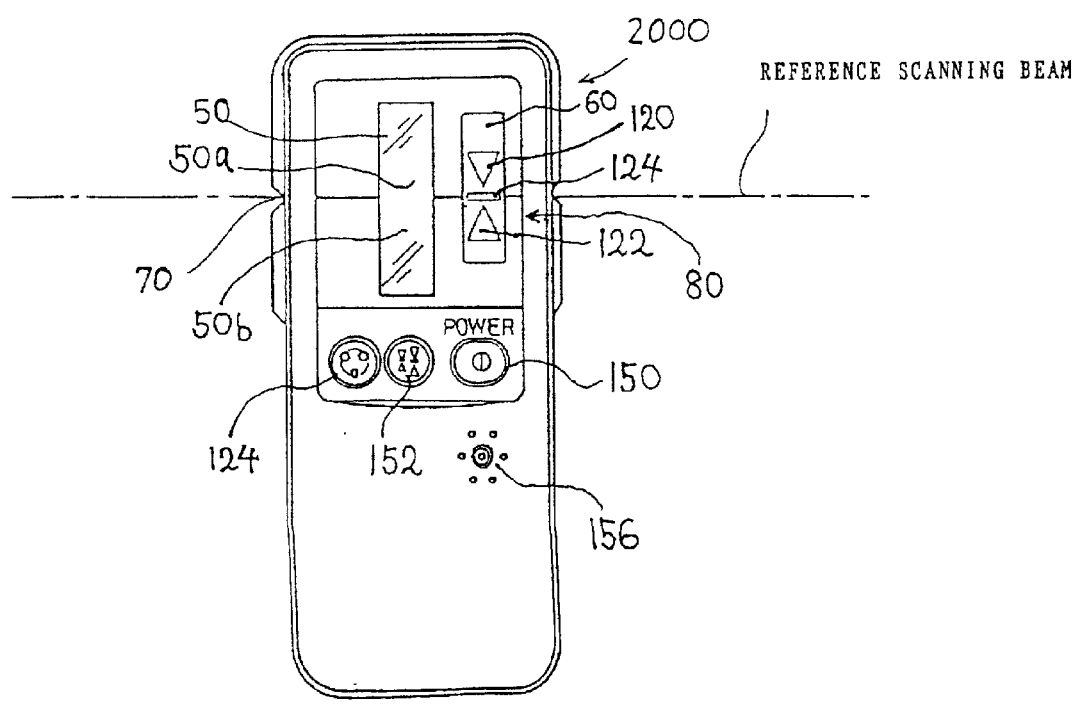

FIG. 6 (PRIOR ART)
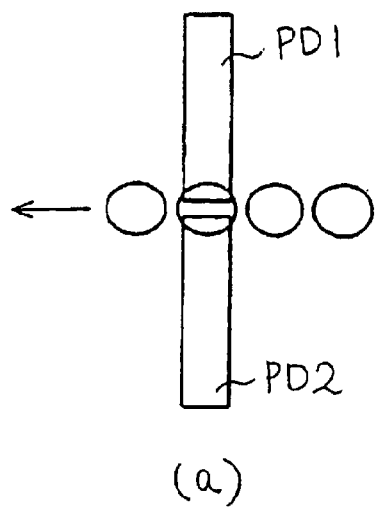
(a)
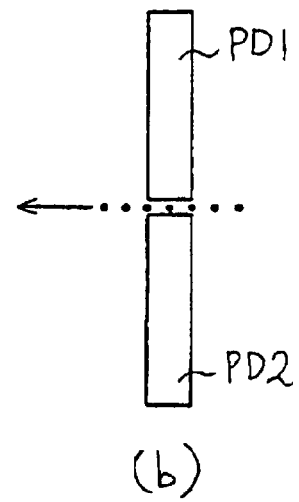
(b)
FIG. 7 (PRIOR ART)
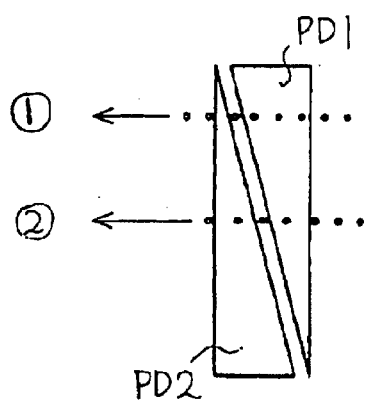 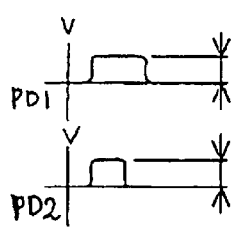 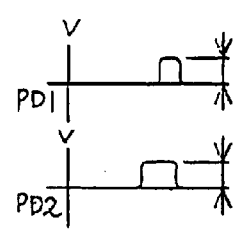

FIG. 8 (PRIOR ART)
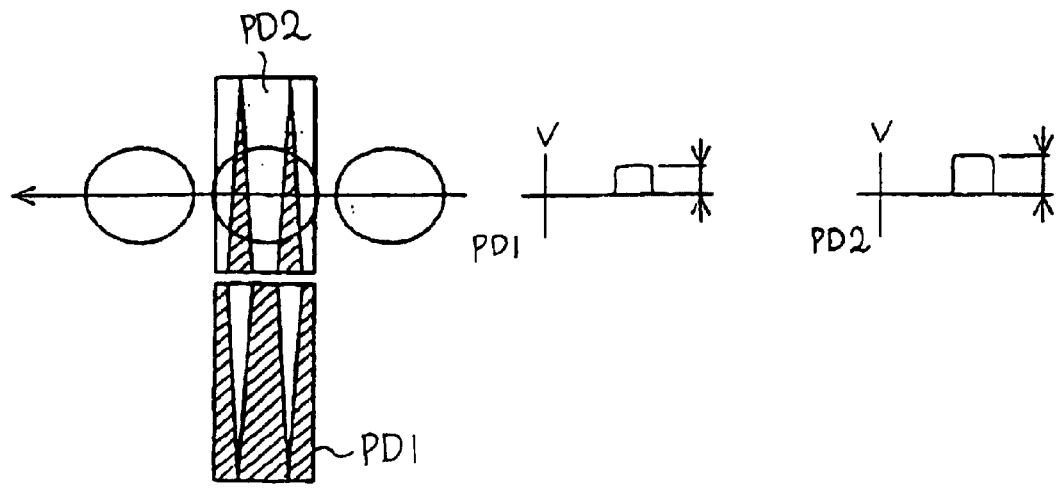
(a)
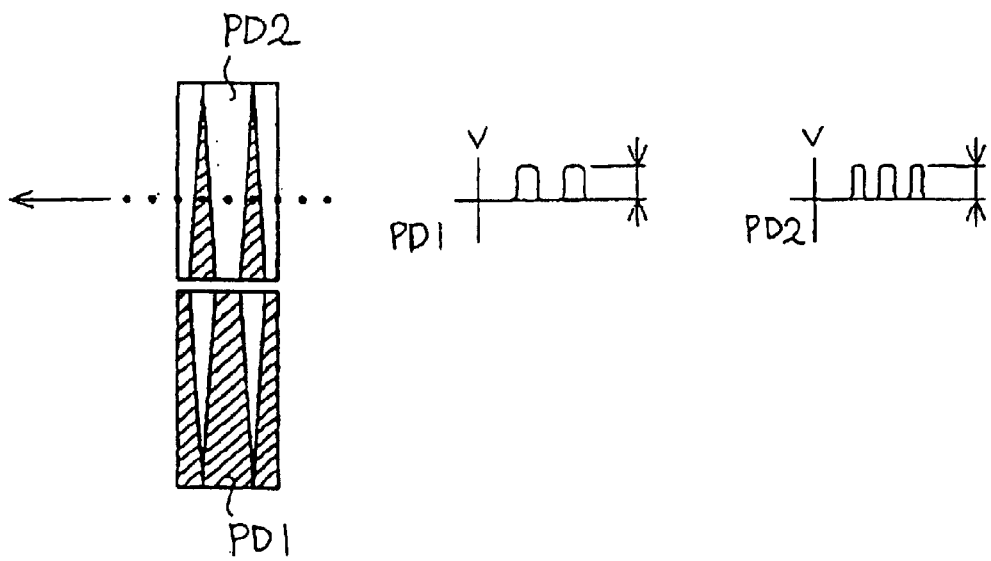
(b)

LASER BEAM RECEIVER

BACKGROUND OF THE INVENTION

The present invention relates to a laser beam receiver and, more particularly, to a laser beam receiver provided with a filter member capable of expanding a laser beam in a scanning direction and of diffusing the laser beam.

A laser beam receiver for receiving a laser beam emitted by a rotary laser device uses a conventional filter for detecting a laser beam focused in a sufficiently large spot to determine the position of the laser beam. The filter is capable of transmitting light of a necessary wavelength and of cutting light of unnecessary wavelengths to the best of its ability.

When a rotary laser device which emits a laser beam of visible light is used, the laser beam can be visually recognized and hence the laser beam must be focused in a spot of the least possible diameter to improve the visibility of the laser beam.

In particular, a rotary laser device for determining a reference position for altitude measurement includes a rotary laser unit, and a light position determining unit which receives a laser beam emitted by the rotary laser unit and determines a reference position for altitude measurement. The rotary laser used an invisible laser beam because a laser light source that emits a visible laser beam was not available.

When an invisible laser beam is used, a light position determining unit is necessary because the laser beam is invisible. The light position determining unit includes a photodetecting device provided with a plurality of photodetectors. The position of the laser beam is determined from the output signal ratio between the output signals of the photodetectors. Since the output signal ratio is used, the laser beam does not need to be focused in a pinpoint spot on the photodetecting device and it is more effective to focus the laser beam in a spot covering some photodetectors.

When a visible-light emitting laser is used, a position on which a laser beam falls can be visually recognized. However, a laser having a limited power capacity must be used to avoid injuring eyes with the laser beam. Since the laser beam emitted by the laser having a limited power capacity has limited energy, the laser beam must be focused in a pinpoint spot having a high luminance and the collimation of the same must be enhanced. However, since it is difficult to collimate the laser beam in the field, a light position determining unit is necessary.

The aforesaid conventional rotary laser device, however, is unable to detect the small spot of the laser beam by the light position determining unit in the worst case where the spot of the laser beam is smaller than gaps between the photodetectors (PDs) of the light position determining unit. Even if the spot has a diameter substantially equal to a lower limit diameter that enables the detection of the spot of the laser beam, the position of the light cannot be measured satisfactorily (in a satisfactory resolution).

It is prevalent to arrange two photodetectors, i.e., an upper photodetector PD1 and a lower photodetector PD2, of the light position determining unit in a direction perpendicular to the scanning direction of the laser beam as shown in FIGS. 6(a) and 6(b). A position where the respective outputs of the photodetectors PD1 and PD2 are the same is the position of the laser beam. The laser beam can be detected when the spot of the laser beam is sufficiently large as shown in FIG. 6(a). However, if the spot of the laser beam is smaller than the gap between the photodetectors PD1 and PD2 as shown in FIG. 6(b), the laser beam cannot be detected.

If the light position determining unit is provided with triangular photodetectors PD1 and PD2 arranged as shown in FIG. 7, the difference between the respective outputs of the photodetectors PD1 and PD2 cannot be obtained and the position of the laser beam cannot be determined unless the laser beam is focused in a spot having a large dimension in the scanning direction. When the triangular photodetectors PD1 and PD2 are arranged as shown in FIG. 7, the position of the spot on the photodetector can be determined on the basis of a peak voltage proportional to the area of part crossed by the spot. Therefore, the difference between the respective outputs of the photodetectors PD1 and PD2 cannot be measured and the position of the laser cannot be determined unless the laser is focused in a spot having a large dimension in the scanning direction.

When the laser beam scanning the photodetector is focused in a small spot, the output of the photodetector is dependent on the energy of the laser beam and is not dependent on the area and hence the peak voltage is the same regardless of the position of the spot on the photodetector. Therefore a peak voltages provided by the photodetector scanned with a laser beam ① and a peak voltage provided by the photodetector scanned with a laser beam ② are the same and hence scanning position cannot be determined. The gap between the photodetectors cannot receive the laser beam.

FIGS. 8(a) and 8(b) show a light position determining unit provided with two photodetectors respectively having different areas. FIG. 8(a) illustrates scanning with a laser beam focused in a large spot and FIG. 8(b) illustrates scanning with a laser beam focused in a small spot. When the small spot is used as shown in FIG. 8(b), the difference between the respective outputs of photodetectors PD1 and PD2 cannot be obtained and hence the position of the laser beam cannot be determined.

The photodetectors PD1 and PD2 shown in FIGS. 8(a) and 8(b) have different areas, respectively. The mode of detection of the laser light by the arrangement shown in FIGS. 8(a) and 8(b) is basically the same as the mode of detection of the laser light by the arrangement shown in FIG. 7. FIG. 8(a) shows a case where the spot of the laser beam is sufficiently large as compared with the photodetectors. The magnitude of peak voltage is dependent on the position of the spot on the photodetector. FIG. 8(b) shows a case where the spot of the laser beam is small. In this case, the peak voltage is constant, the difference between the respective outputs of the photodetectors PD1 and PD2 cannot be obtained and hence scanning position cannot be determined.

SUMMARY OF THE INVENTION

According to the present invention, a laser beam receiver for receiving a scanning laser beam includes a filter device, and a photodetecting means provided with a plurality of photodetectors, wherein the filter device has a lenticular part capable of expanding a scanning laser beam in a scanning direction, and a diffusing part capable of diffusing the laser beam transmitted by the lenticular part.

BRIEF DESCRIPTION OF THE DRAWINGS

FIG. 2 is a view of assistance in explaining a rotary laser device in a preferred embodiment according to the present invention and a light position determining device in a preferred embodiment according to the present invention;

FIG. 6 is a view of assistance in explaining conventional techniques;

FIG. 7 is a view of assistance in explaining conventional techniques; and

FIG. 8 is a view of assistance in explaining conventional techniques.

DESCRIPTION OF THE INVENTION

Preferred embodiments of the present invention will be described with reference to the accompanying drawings.

Referring to FIGS. 1(a) to 1(e), a laser beam receiver 10000 in a preferred embodiment according to the present invention has a filter device 5000 and a photodetecting device 6000.

Figure 1:
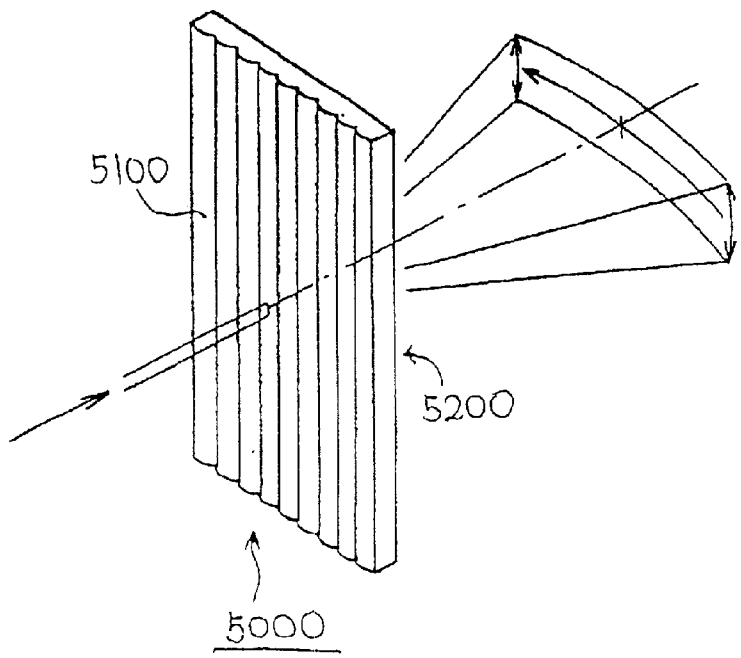
FIG. 1(a) is a view of assistance in explaining a laser beam receiver in a preferred embodiment according to the present invention.
FIG. 1(b) is a view of assistance in explaining the laser beam receiver in the preferred embodiment.
FIG. 1(c) is a view of assistance in explaining the laser beam receiver in the preferred embodiment.
FIG. 1(d) is a view of assistance in explaining the laser beam receiver in the preferred embodiment.
FIG. 1(e) is a view of assistance in explaining the laser beam receiver in the preferred embodiment.
Figure 1:
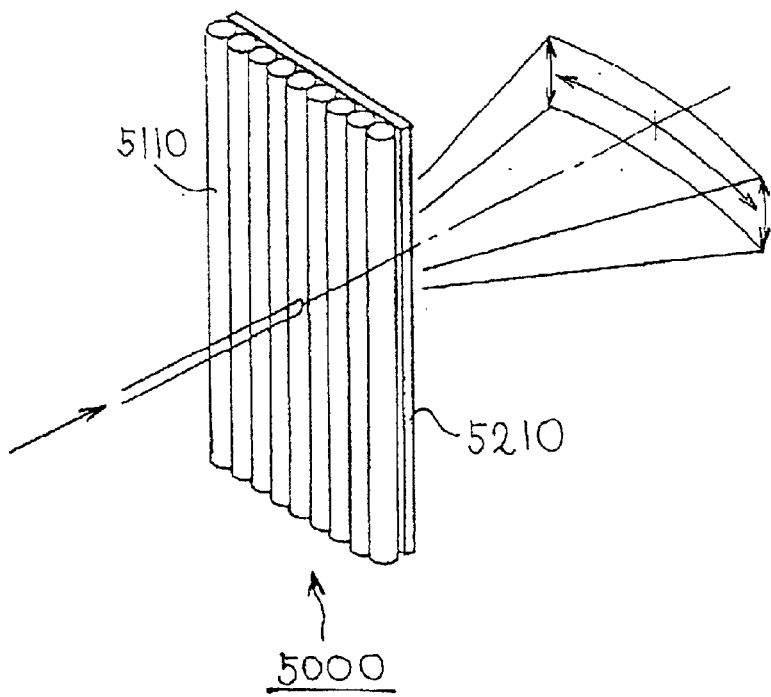
Figure 1:
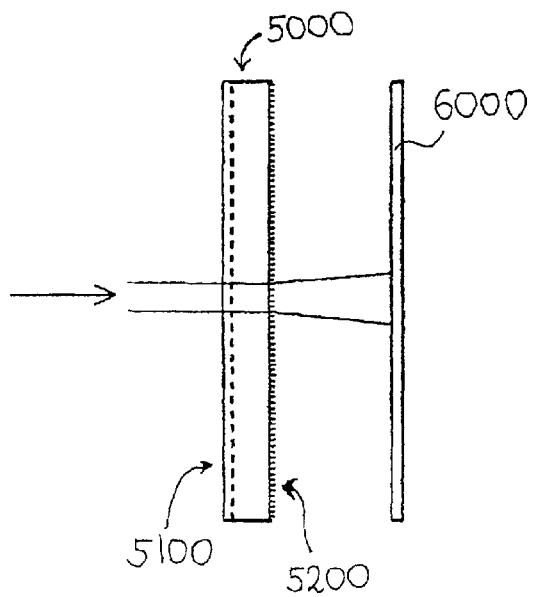
Figure 1:
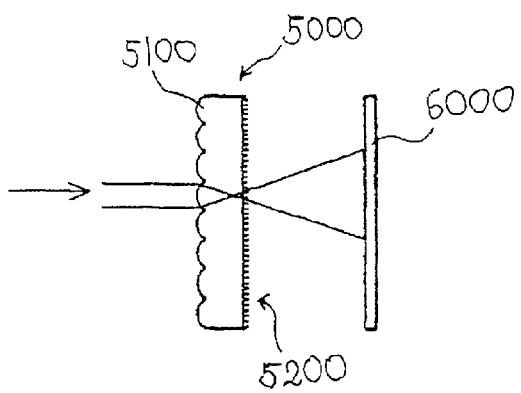
Figure 1:
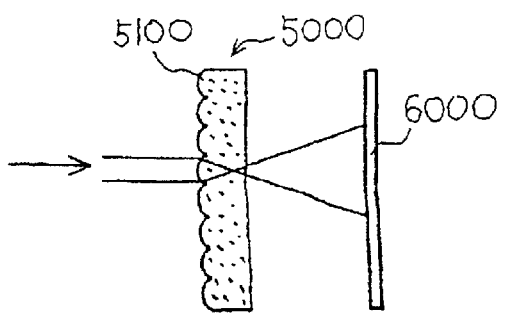

As shown in FIG. 1(d), the filter device 5000 has a front lenticular surface 5100 on which a laser beam falls, and a back diffusing surface 5200. The filter device 5000 is an optical device.

The photodetecting device 6000 corresponds to a photodetecting means provided with a plurality of photodetectors. The laser bean receiver 1000 corresponds to a scanning laser beam receiver. The photodetecting device 6000 is disposed in a direction substantially perpendicular to a scanning direction in which a laser beam moves. The filter device 5000 is disposed in front of the photodetecting device 6000. The filter device 5000 expands the laser beam in a direction crossing the photodetecting device 6000. The diffusing surface 5200 diffuses the expanding laser beam such that the shape of the expanded laser beam is maintained.

The lenticular surface 5100 expands the laser beam emitted by the rotary laser and fallen thereon in a divergent shape in a horizontal plane parallel to the scanning direction. The diffusing surface 5200 diffuses the expanded laser beam expanded by the lenticular surface 5100. Thus the filter device 5000 expands the laser beam emitted by the rotary laser in a divergent shape in a plane parallel to the scanning direction and diffuses the expanded laser beam.

The laser beam fallen on the filter device 5000 is expanded in a sufficient size so as to extend on the photodetecting device 6000 without being affected by the edge of the laser beam, so that the laser beam can be surely recognized. The filter device 5000 has an essential function of a filter to transmit light of necessary wavelengths and cut light of unnecessary wavelengths in addition to functions to expand and diffuse the laser beam.

The laser beam is expanded in a divergent shape in a plane parallel to the scanning direction, because the position of the laser beam does not change and the laser beam can be sufficiently expanded when the laser beam is expanded in a plane parallel to the scanning direction. If the laser beam is expanded in a divergent shape in a plane perpendicular to the scanning direction and upper and lower parts differ even slightly from each other in magnification, the vertical position affects position detection directly and the detected position of the laser beam is not the true position of the laser beam. When the laser beam is expanded vertically, the photodetecting device 6000 must have a long length, which is a problem in the practical use of the photodetecting device 6000.

The filter device 5000 may be provided with cylindrical lenses 5110 as shown in FIG. 1(b) or fibers instead of the lenticular surface 5100, and a diffusing plate 5210 as shown in FIG. 1(b) instead of the diffusing surface 5200.

The filter device 5000 may be formed of a diffusing, fluorescent material and the diffusing surface 5200 may be omitted as shown in FIG. 1(e). Such a filter device 5000 is formed of a transparent material, such as a transparent acrylic resin, containing a fluorescent material. The fluorescent material emits light of a specific fluorescent color and absorbs light of a color complementary to the specific fluorescent color. The fluorescent material is selectively determined so as to conform to the color of the laser beam to be used. When necessary, two or more kinds of fluorescent materials may be added to the transparent material such that fluorescent light can be most effectively emitted when irradiated by a laser beam. The fluorescent material is capable of absorbing and accumulating the energy of light fallen thereon, and releases the energy to emit fluorescent light. The fluorescent materials are metal sulfides containing a very small amount of an impurity (activator, heavy metal), such as calcium sulfide-bismuth and zinc sulfide-copper.

The laser beam fallen on the front surface of the filter device 5000 is absorbed by the fluorescent material, and the fluorescent material emits fluorescent light. Since the fluorescent light is nondirective, the fluorescent light is diffused in all directions about the axis of the laser beam. Basically, the material forming the filter device 5000 is transparent. Therefore most part of the fluorescent light is emitted in the direction of transmission of the laser beam.

A light position determining device 2000 employing the laser beam receiver 10000 will be described with reference to FIG. 2. A survey instrument includes a rotary laser device 1000 and the light position determining device 2000.

The rotary laser device 1000 which uses the filter device 5000 and a photodetecting device 50 will be described. The rotary laser device 1000 is mounted on a tripod, not shown. The rotary laser device 1000 has an upper rotary unit 30 which emits a laser beam 40 so as to sweep a horizontal plane. The rotary laser device 1000 is provided with an operation panel 90. Devices placed on the operating panel 90 are operated to level the rotary laser device 1000, to set a scanning speed and a scanning range and to operate the rotary laser device 1000.

The light position determining device 2000 includes the photodetecting device 50 that receives the laser beam and a display 60 for displaying the position f the received laser beam. Notches 70 are formed in the opposite sides of the light position determining device 2000 is held on a wall or the like to be irradiated with a laser beam 40. The photodetecting device 50 determines a position swept by the laser beam 40. The display 60 determines whether or note the position of the laser beam 40 relative to the light position determining device 2000 is appropriate on the basis of the result of detection provided by the photodetecting device 50 and displays information to that effect. The display unit 60 indicates a direction of displacement and a direction for correction on a pattern 80 if the irradiated position is displaced from a correct position. If the position of the light position determining device 2000 is appropriate, marks are put at positions corresponding to the notches 70 on the wall. The marks indicate a reference position.

The light position determining device 2000 will be described with reference to FIG. 2. The light position determining device 2000 includes the photodetecting device 50 extending in a direction perpendicular to the scanning direction of the laser beam 40, and the display 60 which displays the position of the laser beam 40 relative to a reference position. The display 60 has, for example, a liquid crystal display panel or light-emitting diodes (LEDs). The photodetecting device 50 includes, for example, photodetectors (PDs). The photodetecting device 50 has an upper photodetecting part 50a and a lower photodetecting part 50b. When the photodetecting device 50 is located at a position corresponding to the reference position, the laser beam 40 emitted by the rotary laser device 1000 sweeps a middle part between the upper photodetecting part 50a and the lower photodetecting part 50b. When the photodetecting device 50 is thus located, the display 60 displays a reference position symbol 124. If the laser beam 40 emitted by the rotary laser device 1000 sweeps the upper photodetecting part 50a, the display 60 displays an upward shift symbol 122. Then, the light position determining device 2000 is shifted upward to the position corresponding to the reference position. If the laser beam 40 sweeps the lower photodetecting part 50b, the display 60 displays a downward shift symbol 120. Then the light position determining device 2000 is shifted downward to the position corresponding to the reference position.

The reference position can be determined in a higher accuracy when the photodetecting device 50 includes position sensors, such as PSDs, or photodetectors of a special shape. In such a case, a predetermined position on the photodetecting device is used as a reference position to determine the position of the laser beam relative to the reference position.

The light position determining device 2000 is provided with a main switch 150, a detection accuracy adjusting switch 152, a sound level adjusting switch 124 and a buzzer 156.

Figure 3:
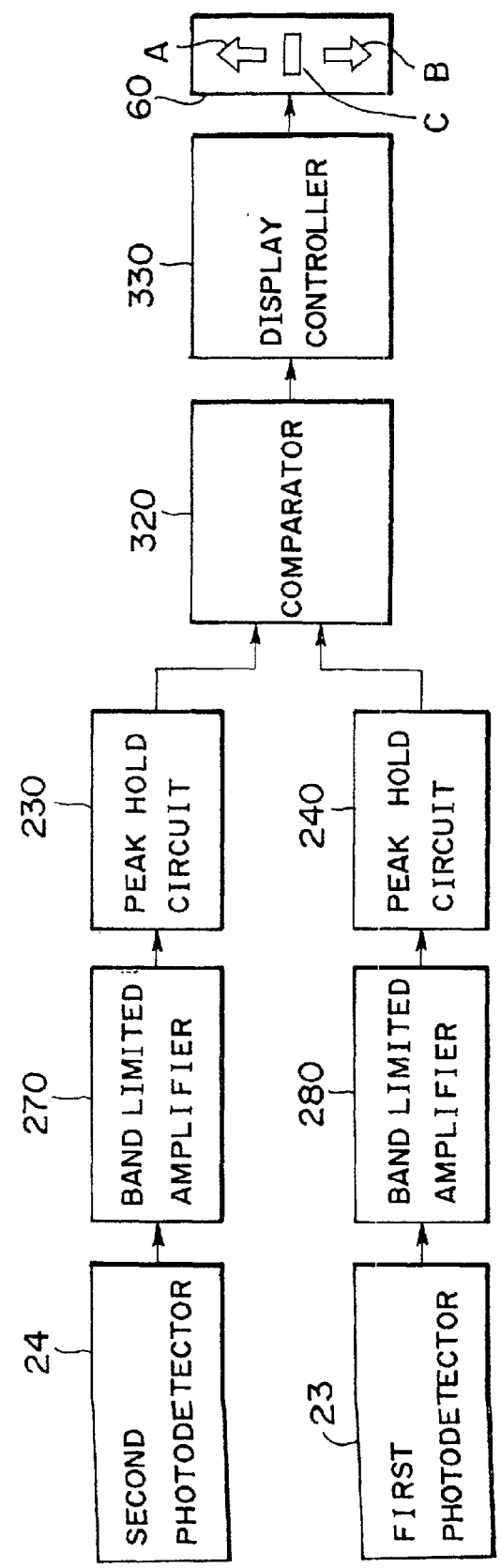
FIG. 3 is a block diagram showing the electrical configuration of the light position determining device in the preferred embodiment.

The electrical configuration of the light position determining device 2000 will be described with reference to FIG. 3. The light position determining device 2000 includes a first photodetector 23, a second photodetector 24, two band limited amplifiers 270 and 280, two peak hold circuits 230 and 240, a comparator 320, a display controller 330 and the display 60. The first photodetector 23 and the second photodetector 24 are components of the photodetecting device 6000 and also components of the photodetecting device 50.

Figure 4:
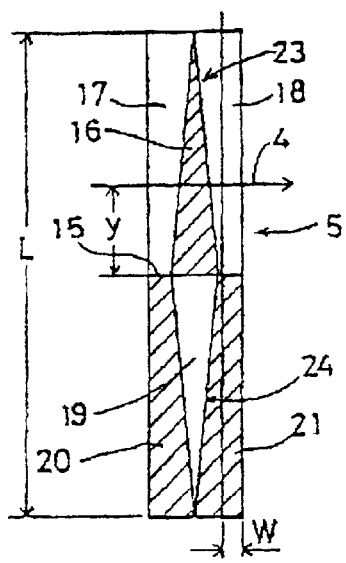
FIG. 4 is a view of assistance in explaining a first photodetector and a second photodetector in the preferred embodiment.

The first photodetector 23 and the second photodetector 24 will be described with reference to FIG. 4. The division of the upper photodetecting part 50a will be described. A horizontal dividing line 15 dividing the photodetecting device 50 into upper and lower parts is divided into equal four sections. The upper photodetecting part 50a is divided into three sections, i.e., a triangular middle section 16 having the shape of an erect triangle having its base corresponding to the two middle sections of the dividing line 15 and a vertex at the middle of the upper side of the photodetecting device 50, and two trapezoidal side sections 17 and 18 having the shape of an inverted trapezoid and lying on the opposite sides of the middle section 16, respectively. The lower photodetecting part 50b is divided into three sections symmetrical with the three sections of the upper photodetecting part 50a with respect to the dividing line 15, i.e., a triangular middle section 19 having the shape of an inverted triangle having its base corresponding to the two middle sections of the dividing line 15 and a vertex at the middle of the lower side of the photodetecting device 50, and two trapezoidal side sections 20 and 21 having the shape of an erect trapezoid and lying on the opposite sides of the middle section 19, respectively.

The triangular middle section 16 having the shape of an erect triangle, and the trapezoidal side sections 20 and 21 having the shape of an erect trapezoid (shaded sections in FIG. 4) form the first photodetector 23. The triangular middle section 19 having the shape of an inverted triangle, and the trapezoidal side sections 17 and 18 having the shape of an inverted trapezoid (blank sections in FIG. 4) form the second photodetector 24.

The peak hold circuit 230 is connected through the band limited amplifier 270 to the second photodetector 24 of the photodetecting device 50. The comparator 320 is connected to the peak hold circuit 230. The peak hold circuit 240 is connected through the band limited amplifier 280 to the first photodetector 23 of the photodetecting device 50. The comparator 320 is connected to the peak hold circuit 240. The peak hold circuits 230 and 240 hold the peak values of signals provided by the band limited amplifiers 270 and 28, respectively for a time longer than a time for which the photodetecting device 50 is irradiated with the laser beam 40.

The comparator 320 compares the respective outputs of the first photodetector 23 and the second photodetector 24 of the photodetecting device 50 and gives a signal representing the result of comparison to the display controller 330. The respective outputs of the first photodetector 23 and the second photodetector 24 are equal when the laser beam 40 sweeps the middle part of the photodetecting device 50 horizontally. The output of the first photodetector 23 is greater than that of the second photodetector 24 when the scanning line is shifted from the middle between the photodetectors 23 and 34 toward the side of the first photodetector 23. The output of the second photodetector 24 is greater than that of the first photodetector 23 when the scanning line is shifted from the middle between the photodetectors 23 and 24 toward the side of the second photodetector 24.

The display controller 330 selects a symbol, i.e., one of symbols A, B and C, to be displayed by the display 60 according to the output of the comparator 320 and gives a signal representing a selected symbol to the display 60. The display 60 displays the symbol specified by the output signal of the display controller 330.

Figure 5:
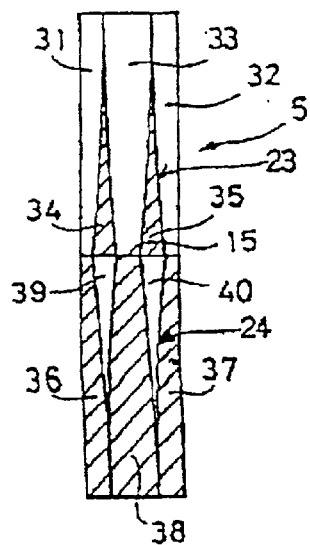
FIG. 5 is a view of assistance in explaining a first photodetector and a second photodetector in the preferred embodiment.

As shown in FIG. 5, the first photodetector 23 and the second photodetector 24 may be divided by different dividing lines, respectively. The dividing lines dividing the upper photodetecting part 50a into trapezoidal sections 31, 33 and 32 respectively having the shapes of inverted trapezoids and triangular sections 34 and 35 respectively having the shapes of erect triangles have varying gradients decreasing toward the horizontal dividing line 15, respectively. The accuracy of detection of the horizontal dividing line 15, i.e., determination of position, can be improved by increasing the rate of variation of the gradient toward the horizontal dividing line 15. The effect of such division on the lower photodetecting part 50b is the same as that described above and hence further description of the effect will be omitted.

The first photodetector 23 and the second photodetector 24 correspond to the photodetecting means. The first photodetector 23 and the second photodetector 24 are arranged on a line perpendicular to the scanning direction and are divided into sections.

As it is known from the shape of the photodetector and the scanning direction of the laser beam, the sections of the photodetector are arranged in the scanning direction of the laser beam. The expansion of the laser beam in the direction of arrangement of the divided sections is effective. The diffusion of the laser beam reduces the effect of the optical member which expands the laser beam. The joint of optical members often affect a photodetection signal.

As apparent from the foregoing description, according to the present invention, the filter device and the photodetecting means including the plurality of photodetectors form the laser beam receiver for receiving a scanning laser beam, the lenticular surface of the filter device expands the laser beam in the scanning direction, and the diffusing surface of the filter device diffuses the laser beam. Thus, the laser beam can be expanded in the scanning direction and the expanded laser beam can be diffused, so that the position of the laser beam can be determined even in the laser beam is focused in a small spot.

What is claimed is:

1. A laser beam receiver for receiving a scanning laser, comprising an optical member, and a photodetecting means including a plurality of photodetectors; wherein the photodetectors are arranged on a line substantially perpendicular to a scanning direction in which the laser bean moves for scanning, the optical member is disposed in front of the photodetectors, expands the laser beam in a direction crossing the photodetectors and is capable of diffusing the expanded laser beam such that the shape of the expanded laser beam is maintained.

2. A laser beam receiver for receiving a scanning laser according to claim 1, wherein the receiving means for receiving an expanding laser beam comprising two light receiving elements arranged on a line perpendicular to a scanning direction and two light receiving elements are divided into two sections.

3. A laser beam for receiving a scanning laser according to claim 1, wherein an optical member for expanding a scanning laser light in the scanning direction is the lenticular lens and the diffusing part is formed on the optical member for diffusing the transmitted laser light.

4. A laser beam receiver for receiving a scanning laser according to claim 1, wherein a fluorescent material is contained in an optical member instead of the diffusing part.

* * * * *